(12) United States Patent
Taher et al.

(10) Patent No.: US 11,388,039 B1
(45) Date of Patent: Jul. 12, 2022

(54) IDENTIFYING PROBLEM GRAPHS IN AN INFORMATION TECHNOLOGY INFRASTRUCTURE NETWORK

(71) Applicant: International Business Machines Corporation, Armonk, NY (US)

(72) Inventors: Luke Taher, Heswall (GB); Kilian David Joseph Collender, London (GB); Jorge Alberto Diaz Garcia, London (GB); Charles John Scates, London (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/301,628

(22) Filed: Apr. 9, 2021

(51) Int. Cl.
*H04L 41/0631* (2022.01)
*H04L 41/12* (2022.01)
*H04L 41/069* (2022.01)

(52) U.S. Cl.
CPC ........ *H04L 41/0631* (2013.01); *H04L 41/069* (2013.01); *H04L 41/12* (2013.01)

(58) Field of Classification Search
CPC ............... G06F 11/0709; G06F 11/079; G06F 11/3466; G06F 11/3048; G06F 11/3476; G06F 16/24578; G06F 16/9024; G06F 2216/03; G06F 16/334; G06F 16/24564; G06F 21/552; H04L 41/12; H04L 45/02; H04L 41/0631; H04L 41/0636; H04L 41/064; H04L 41/069; H04L 41/0654; H04L 63/0263; H04L 63/1425; G06N 5/04
See application file for complete search history.

(56) References Cited

U.S. PATENT DOCUMENTS

| | | | | |
|---|---|---|---|---|
| 8,572,237 | B2* | 10/2013 | Ginkel | G06F 9/5077 709/224 |
| 9,537,720 | B1 | 1/2017 | Baggott | |
| 9,811,588 | B1* | 11/2017 | Ohsie | G06F 17/30 |
| 10,425,290 | B1* | 9/2019 | Oren | H04L 41/22 |
| 10,476,749 | B2* | 11/2019 | Yoshihira | H04L 41/0672 |
| 10,503,581 | B2 | 12/2019 | Justin | |

(Continued)

OTHER PUBLICATIONS

Alvaro Brandon et al., Graph-based root cause analysis for service-oriented and mircroservice architectures; Oct. 15, 2019; The Journal of Systems and Sofware 159; pp. 1-17 (Year: 2019).*

(Continued)

*Primary Examiner* — Tonia L Dollinger
*Assistant Examiner* — Linh T. Nguyen
(74) *Attorney, Agent, or Firm* — Stephen R. Yoder

(57) ABSTRACT

Method and system are provided for identifying problem graphs in an information technology infrastructure network. The method includes: selecting a set of nodes in a topology, wherein the nodes of the topology represent resources in an information technology infrastructure network; querying historical timeseries data for the selected nodes, wherein the timeseries data records changes in state of the resources represented by the nodes; and analyzing the timeseries data for the selected nodes across problem time periods to produce a set of historical directional rules defining one or more historic problem graph. The method may search the historic problem graphs for current problem state nodes to determine likely causing nodes and affected nodes of a current problem.

20 Claims, 10 Drawing Sheets

(56) References Cited

U.S. PATENT DOCUMENTS

| | | |
|---|---|---|
| 10,505,825 B1 | 12/2019 | Bettaiah |
| 10,616,043 B2 | 4/2020 | Wang |
| 2011/0292834 A1 | 12/2011 | Agrawal |
| 2015/0271008 A1* | 9/2015 | Jain .................. H04L 41/0672 |
| | | 714/57 |
| 2015/0326446 A1* | 11/2015 | Koverman .......... H04L 41/0631 |
| | | 709/224 |
| 2017/0068581 A1 | 3/2017 | Qi |
| 2017/0075749 A1* | 3/2017 | Ambichl ............. G06F 11/0748 |
| 2017/0279923 A1* | 9/2017 | Kumar ..................... H04L 43/16 |
| 2017/0330096 A1* | 11/2017 | Das Gupta .......... G06F 11/0769 |
| 2018/0046715 A1* | 2/2018 | Wang ..................... G06F 16/951 |
| 2018/0351825 A1* | 12/2018 | Thomson ................ H04L 41/12 |
| 2019/0158524 A1 | 5/2019 | Zadeh |
| 2019/0165988 A1* | 5/2019 | Wang .................. H04L 41/0631 |
| 2019/0227860 A1* | 7/2019 | Gefen ................. G06F 11/0709 |
| 2019/0268214 A1 | 8/2019 | Maes |
| 2019/0306011 A1 | 10/2019 | Fenoglio |
| 2019/0363951 A1 | 11/2019 | Vasseur |
| 2020/0042426 A1* | 2/2020 | Ambichl ............. G06F 11/3495 |
| 2020/0106660 A1* | 4/2020 | Kakani ............... G06F 11/0709 |
| 2020/0382361 A1* | 12/2020 | Chandrasekhar ........ G06N 5/04 |
| 2021/0111943 A1* | 4/2021 | Moser ..................... H04L 12/24 |

OTHER PUBLICATIONS

Mell et al., "The NIST Definition of Cloud Computing", National Institute of Standards and Technology, U.S. Department of Commerce, Special Publication 800-145, Sep. 2011, 7 pages.

Wang et al., "GRANO: Interactive Graph-based Root Cause Analysis for Cloud-Native Distributed Data Platform", Proceedings of the VLDB Endowment, vol. 12, No. 12, ISSN 21508097, Aug. 1, 2019, 4 pages.

* cited by examiner

US 11,388,039 B1

IDENTIFYING PROBLEM GRAPHS IN AN INFORMATION TECHNOLOGY INFRASTRUCTURE NETWORK

BACKGROUND

The present invention relates to management of information technology (IT) systems, and more specifically to identifying problem graphs from which problem trees can be obtained in an IT infrastructure network.

Management of Information Technology (IT) systems is an increasingly complex problem for large organizations with expanding IT infrastructures. Many organizations employ Network Operations Centers (NOCs) in which trained operators utilize IT Operations Management software to diagnose and repair problems, known as incidents, in real time as they occur within their IT infrastructure. Incidents are caused by problems which typically occur on physical or virtual devices within an IT infrastructure, often these resources are relied on by one or more other resources in the infrastructure, which will be referred to as child resources, which in turn may be depended on by their own children. Consequently, incidents might consist of alerts from multiple resources, each indicating a local problem.

Typically, incidents have a single root cause problem on a single problem resource. Each resource in an IT infrastructure typically has a range of problem states, each with a unique set of consequences for child resources. Operators are often able to diagnose root cause problems by determining the impact on child resources through inspection of the alerts associated with the given incident.

As with the resources, the dependency relationships between resources can also be represented as a virtual or physical link, such as a microservice application depending on a virtual container runtime or a bare metal server depending on a physical connection to a network switch.

These relationships can be represented using an extended IT network topology graph, which is a representation of the IT network as a graph with resources modeled as nodes and the connections between resources modeled as edges.

During an incident, alerts occur across the extended IT network topology graph. An incident is normally caused by one or more resources entering a problem state which may cascade down to child resources to form a problem graph or indeed this problem graph could be formed by one or more child resources entering problem state cascading upstream.

Currently, operators utilize domain knowledge to manually identify problem graphs. Operators aim to diagnose the root cause problem by inspecting the network topology and manually identifying a pattern presented by the problem graph to find the root cause. This allows the operators to collect related events in the identified graph to simplify the complexity of the incident and thus reduce the Mean Time to Know (MTTK).

SUMMARY

According to an aspect of the present invention there is provided a computer-implemented method for identifying problem graphs in an information technology infrastructure network, comprising: selecting a set of nodes in a topology, wherein the nodes of the topology represent resources in an information technology (IT) infrastructure network; querying historical timeseries data for the selected nodes, wherein the timeseries data records changes in state of the resources represented by the nodes; and analyzing the timeseries data for the selected nodes across problem time periods to produce a set of historical directional rules defining one or more historic problem graph.

This infers problem graphs based on temporal patterns from historic state change data without the need for prepared heuristic rules. This can discover relationships which may otherwise be ignored.

Each rule of the set of historical directional rules may identify an indicative problem subgraph and a consequent problem subgraph formed of subsets of node-state pairs with direction dependencies.

Analyzing the timeseries data for the selected nodes may include: identifying problem time periods in which neighboring or close nodes change problem state indicative of causality relationships; and determining if causality relationships consistently occur by applying an association rule mining algorithm.

Analyzing the timeseries data for the selected nodes may include: producing transactions based on the problem time periods; and performing association rule mining on the transactions to identify subsets of items in the form of node-state pairs which typically co-occur across multiple transactions and a directional dependency between them; and producing the set of historical directional rules defining an historical problem graph based on the subsets of node-state pairs and their directional dependencies. Producing transactions based on the problem time periods may include defining a quiet period threshold to define a single problem time period and defining a distance threshold for nodes relating to the same problem.

The method may include allocating a confidence score to each edge of the historic problem graph based on a score produced for a historical directional rule.

The method may include searching the historic problem graphs for current problem state nodes to determine likely causing nodes and affected nodes of a current problem. The method may order the historic problem graphs and read the historic problem graphs to find root and/or child nodes off the problem nodes to determine a root cause of a problem and/or to predict affected resources. The ordering of the graphs may be based on combined allocated confidence scores of each edge of a historic problem graph based on scores produced for each historical directional rule. The prediction of the root and/or child nodes may be based on the allocated confidence scores of edges in the historical problem graph.

The method may define a topology of an information technology infrastructure network, with nodes representing virtual or physical resources with connectivity defined by edges in the topology, including labelling nodes to delineate domains and define sub-topologies. Selecting the set of nodes in the topology may select nodes by a labelled domain. The method may include periodically collecting state data from resources represented by the nodes and storing in a timeseries graph data store suitable for querying. The method may include configuring time intervals of the timeseries data and the problem time periods.

According to another aspect of the present invention there is provided a computer-implemented method for identifying problem graphs in an information technology infrastructure network, comprising: detecting a set of nodes in a topology with a current problem state, wherein the nodes of the topology represent resources in an information technology infrastructure network; searching for the problem state nodes in one or more historic problem graphs; ordering the historic problem graphs by prevalence; reading one or more of the ordered historic problem graphs to find root and/or child nodes off the problem nodes; and obtaining a problem tree with problem node state changes to produce an ordered list of likely causes and/or an ordered list of likely affected nodes.

The method has an advantage of using historic problem graphs when evaluating similar problem live events in the IT infrastructure network to match anomalous topological patterns. This may be used to predict a root cause problem node and/or to predict affected nodes by reading a problem tree based on an historic problem graph.

According to a further aspect of the present invention there is provided a system for identifying problem graphs in an information technology infrastructure network, comprising: a processor and a memory configured to provide computer program instructions to the processor to execute the function of the components: a node selecting component for selecting a set of nodes in a topology, wherein the nodes of the topology represent resources in an information technology infrastructure network; a state change data querying component for querying historical timeseries data for the selected nodes, wherein the timeseries data records changes in state of the resources represented by the nodes; and an analyzing component for analyzing the timeseries data for the selected nodes across problem time periods to produce a set of historical directional rules defining one or more historic problem graph.

The analyzing component may include a rules component for producing a set of historical directional rules defining an historic problem graph, wherein each rule of the set of historical directional rules identifies an indicative problem subgraph and a consequent problem subgraph formed of subsets of node-state pairs with direction dependencies.

The analyzing component may further include: a problem periods component for identifying problem time periods in which neighboring or close nodes change problem state indicative of causality relationships; and an association rule mining component for determining if causality relationships consistently occur by applying an association rule mining algorithm.

The analyzing component may include: a transaction component for producing transactions based on the problem time periods; and wherein the association rule mining component may perform association rule mining on the transactions to identify subsets of items in the form of node-state pairs which typically co-occur across multiple transactions and a directional dependency between them, and produces the set of historical directional rules defining an historical problem graph based on the subsets of node-state pairs and their directional dependencies.

The transaction component may produce transactions based on the problem time periods includes defining a quiet period threshold to define a single problem time period and defining a distance threshold for nodes relating to the same problem.

The system may further include a current problem analyzing component for searching the historic problem graphs for current problem state nodes to determine likely causing nodes and affected nodes of a current problem.

The system may include a topology defining component for defining a topology of an information technology infrastructure network, with nodes representing virtual or physical resources with connectivity defined by edges in the topology, including labelling nodes to delineate domains and define sub-topologies. The node selecting component for selecting the set of nodes in the topology may select nodes by a labelled domain.

The system may include a state data gathering component for periodically collecting state data from resources represented by the nodes and storing in a timeseries graph data store suitable for querying. The system may include a configuring component for configuring time intervals of the timeseries data and the problem time periods.

According to a further aspect of the present invention there is provided a system for identifying problem graphs in an information technology infrastructure network, comprising: a processor and a memory configured to provide computer program instructions to the processor to execute the function of the components: a node detecting component for detecting a set of nodes in a topology with a current problem state, wherein the nodes of the topology represent resources in an information technology infrastructure network; a node searching component for searching for the problem state nodes in one or more historic problem graphs; a problem graph ordering component for ordering the historic problem graphs by prevalence; a problem graph reading component for reading one or more of the ordered historic problem graphs to find root and/or child nodes off the problem nodes; and a reporting component for obtaining a problem tree with problem node state changes to produce an ordered list of likely causes and/or an ordered list of likely affected nodes.

According to a further aspect of the present invention there is provided a computer program product for identifying problem graphs in an information technology infrastructure network, the computer program product comprising a computer readable storage medium having program instructions embodied therewith, the program instructions executable by a processor to cause the processor to: select a set of nodes in a topology, wherein the nodes of the topology represent resources in an information technology infrastructure network; query historical timeseries data for the selected nodes, wherein the timeseries data records changes in state of the resources represented by the nodes; and analyze the timeseries data for the selected nodes across problem time periods to produce a set of historical directional rules defining one or more historic problem graph.

The computer program product may include program instructions executable by a processor to cause the processor to: detect a set of nodes in a topology with a current problem state, wherein the nodes of the topology represent resources in an information technology infrastructure network; search for the problem state nodes in one or more historic problem graphs; order the historic problem graphs by prevalence; read one or more of the ordered historic problem graphs to find root and/or child nodes off the problem nodes; and obtain a problem tree with problem node state changes to produce an ordered list of likely causes and/or an ordered list of likely affected nodes.

In some embodiments of the present invention, the computer readable storage medium is a non-transitory computer readable storage medium and the computer readable program code is executable by a processing circuit (or a set of processor(s)).

Figure 1:
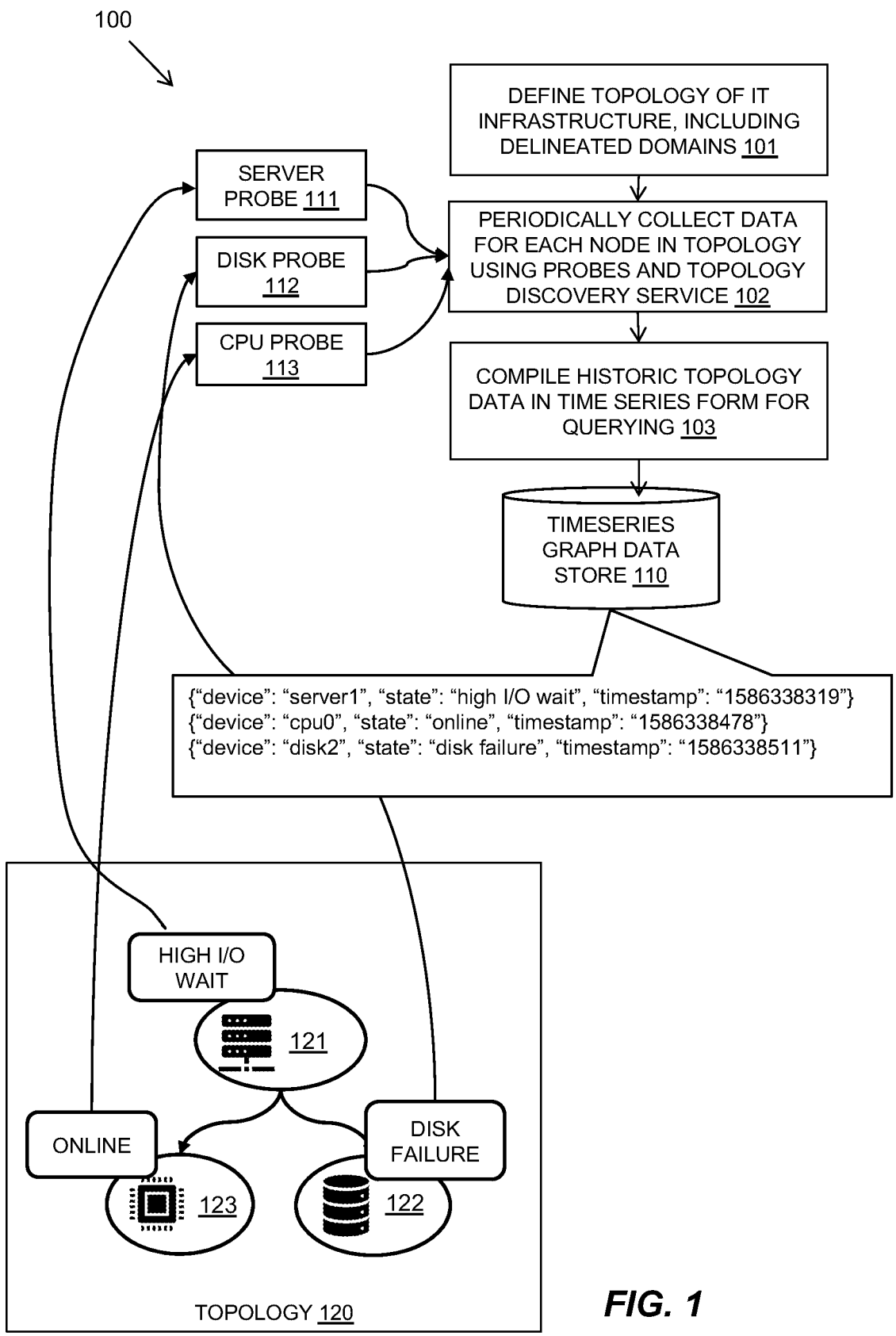
FIG. 1 is a schematic diagram of an example embodiment of an aspect of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are provided for automatically identifying problem graphs by utilizing historic temporal relationships between network resources and their temporal changes in state to deduce rules for predicting a root cause in future occurrences of a similar incident. The rule mining identifies problem graphs and the problem graphs are used during live events to identify problem trees.

The following definitions are used in this description. A "network topology" is a representation of an IT network as a graph with resources modeled as nodes and the connections between resources modeled as edges. A "network sub-topology" is a subgraph of the graph representing an IT network. A "problem graph" is a network sub-topology containing only nodes in a problem state. A "problem tree" are the nodes of a problem graph with only edges which represent causal relationships of a problem describing a flow of problem states through the network sub-topology.

The described method isolates related areas of connected topological components and produces node-state pairs representing the state of a node at a given time interval. These pairs are subsequently bucketed with pairs from the other nodes in the related topology at the same time intervals. Association rule learning is performed on these buckets to identify temporal relationships, in the form of rules, between node-state pairs. These rules are used to construct one or more problem graphs for the given topology. Later occurrences of these node-state pairs in a live environment can be used to determine or predict the problem tree for a given incident.

The described method provides automatic identification of problem graphs, regardless of the problem context. This reduces the operator domain knowledge required to diagnose a problem graph. Problem graphs may be identified within an existing stateful network topology by applying rule mining algorithms across a temporal period.

The problem graphs are used to identify the root cause of a problem using rules defined by previous incidents to help operators resolve incidents quickly. This is done by using both the structure of the network topology in the form of a static graph along with historical instances of the problem state changes within this network topology. Connected topology is used as a base to guide the rule mining algorithms and to produce a foundational structure to apply to equivalent topological structures in the future.

This method combines the topological connectivity of network resources with their temporal changes in state to deduce rules to predict the root cause in future occurrences of a similar incident. It uses the temporal state changes over time, combined with the connectivity to determine the problem graphs related to a root cause, allowing the system to mine the rules without external influence.

The eventual goal may be to show an operator what is believed to be the root cause of the issue and affected resources.

The method uses previous similar events and structures to closely match anomalous topological patterns. Thus, providing a robust identification method in an established topological structure.

The described method helps the operator find the root causes of a given issue, without the need for prepared heuristic rules. Inferring of problem graphs by rule mining on historical data, can discover relationships between components in a system as result of an event that could be otherwise ignored.

Referring to FIG. 1, a schematic diagram 100 shows an example embodiment of a method for gathering data for use in the described method of identify a root cause of a problem in an IT infrastructure network.

The method defines 101 a topology 120 of an IT infrastructure network, including delineated domains that may be used to define sub-topologies. The topology represents an IT infrastructure network that with nodes representing physical and virtual entities in the infrastructure with connectivity of entities defined in the topology. The topology graph may be stable in terms of the nodes or may change over time, for example, with nodes being replaced with other nodes which are of a same or similar type. In some instances, the resources represented by the nodes may change substantially and further training may be required to update existing discovered rules.

In the defined topology graph, the state of its nodes changes over time as a result of incidents and these temporal changes are used in the described method. The concept of incidents as an identified faulty status adds another dimension to the data monitored by the topology graph.

In this example, the topology 120 has three nodes of a server 121, a disk 122, and a central processing unit (CPU) 123. In practice, a topology may be a much larger network across multiple domains. The states of the nodes are a high I/O wait of the server 121, a disk failure of the disk 122, and an online status of the CPU 123.

The status data for each node is collected 102 periodically from the live sub-topology 120 by probes 111, 112, 113 monitoring the environment which are persisted in a graph database such as via a central discovery service.

Historic topology status data is compiled 103 in timeseries form in a timeseries graph data store 110 suitable for querying. This data allows for modeling of problem graphs as state changes across a given set of nodes. The graph data store may allow sub-topologies to be queried freely.

Figure 2A:
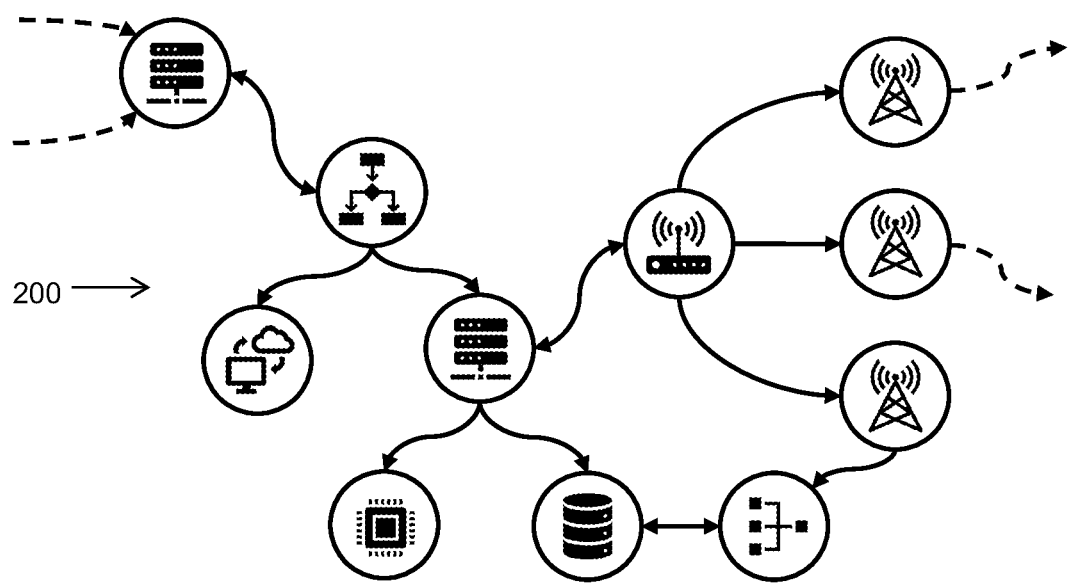
FIGS. 2A and 2B are illustrations of sub-topologies as used in aspects of the present invention.
Figure 2B:
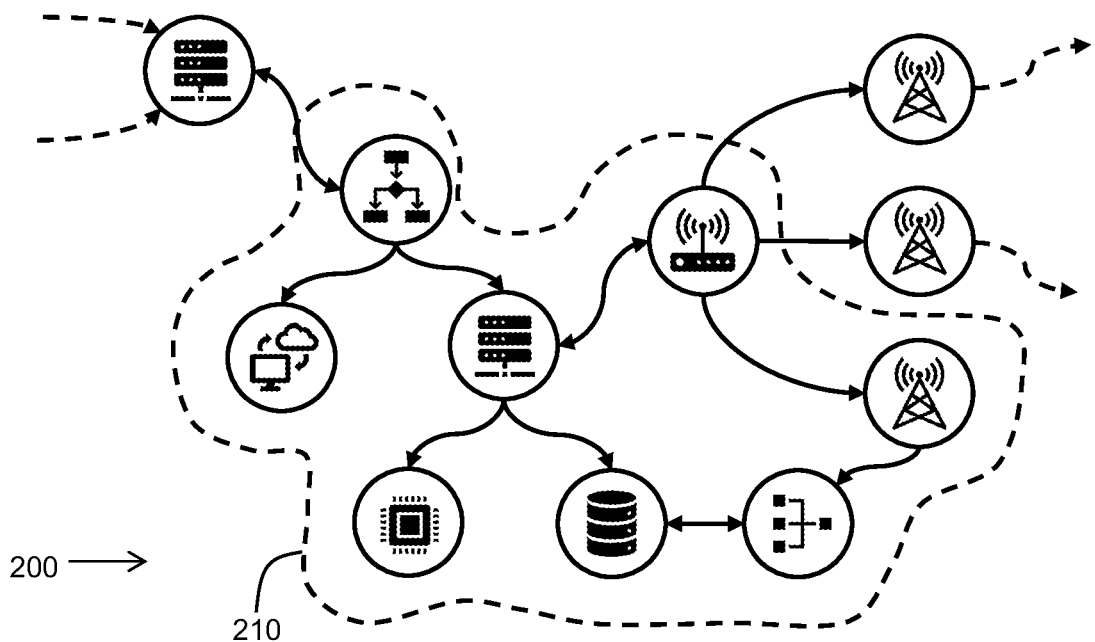

While the described method may be applied to complete topologies, often topologies consist of subgraphs which represent sub-topologies that are delineated by a domain concept such as business owner, application, or management team. Incidents and their associated problem graphs are often also investigated against these delineations and so the topology system may have a method of labelling and separating sub-topologies using these delineations and may isolate problem graphs within these sub-topologies rather than the graph as a whole. An illustration of a sub-topology 200 is shown in FIG. 2A and a problem graph 210 within the sub-topology 200 it is shown in FIG. 2B.

Figure 3A:
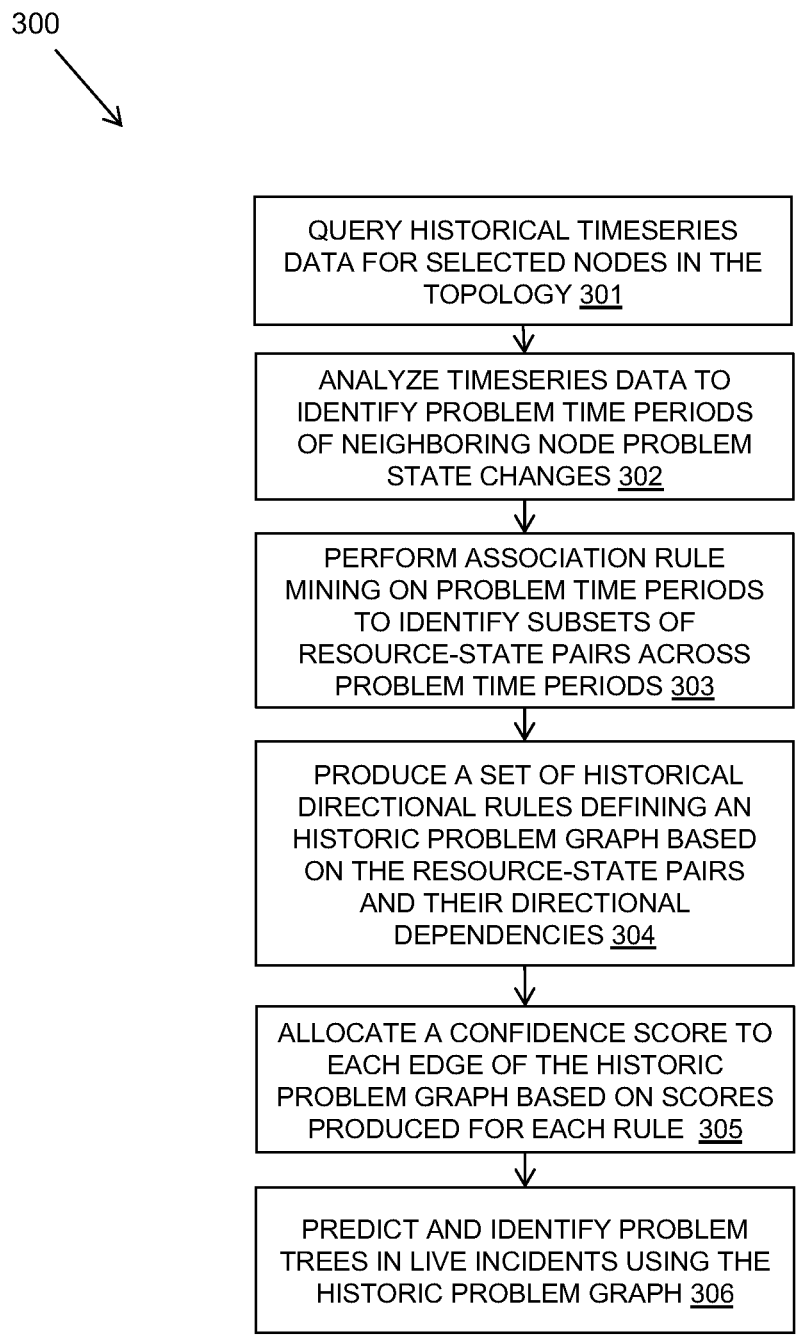
FIG. 3A is a flow diagram of an example embodiment of an aspect of a method in accordance with the present invention.

Referring to FIG. 3A, a flow diagram 300 shows an example embodiment of the described method of identifying a problem graph of resources in an IT infrastructure network.

A defined topology 120 of a static information technology infrastructure network is referenced as described in relation to FIG. 1, with nodes representing virtual or physical resources with connectivity defined by edges in the topology. The associated timeseries graph data store 110 is also referenced, with the interval and sample periods as configurable parameters. The collecting and storing of timeseries data are carried out as a discrete process independently of the identification of historic problem graphs described in the flow diagram 300 of FIG. 3A.

The method may query 301 the historical timeseries data store 110 as generated in the method of FIG. 1 for the topology 120 to retrieve historical timeseries data for a set of selected nodes. The set of nodes may be a whole topology or a sub-topology of interest within the topology, such as a sub-topology for a given domain or a sub-set of the domain. The set of nodes may be referred to as a sub-topology. The selected set of nodes within the topology have their associated state stored in the historical timeseries data at equal time intervals.

The existing timeseries graph data store 110 of topology data can be freely queried to retrieve data for connected topology components over a given time. These queries also provide data for each node in the graph including but not limited to the name, a method of unique identification, and the current state of the device represented by the given node.

Each sub-topology graph with state information at each time interval is collected in this way in order to identify historic problem periods within each sub-topology.

For each sub-topology, analysis 302 is performed of the time interval data to identify problem periods in the sub-topology where neighboring or close nodes enter, transition between, or exit, in problem states at a similar time. These problem periods are potentially indicative of causality relationships either directly or transitively.

In order to determine if these causality relationships are tangible, it is determined if they consistently occur. This task is performed 303 using a known association rule mining technique on the problem time periods to identify subsets of node-state pairs across problem time periods.

In order to utilize association rule mining, the method first forms the so-called 'transactions' which are the standardized input for association rule mining. This method is described in the pseudocode below.

Transactions in association rule mining represent an instance of a set of items. The association rule mining algorithm identifies subsets of items which typically co-occur across multiple transactions and a directional dependency between them. Support and confidence hyperparameters allow for the behavior of the algorithm to be adjusted to set the minimum number of occurrences and the likelihood of co-occurrence of the rules respectively.

Association rule mining is performed on the transactions of sets of items of node-state pairs, where each transaction is one of the problems from the previous step. This produces a set of directional association rules. The association rules each consist of an antecedent and a consequent. The antecedent is a set of node-state pairs which represent an initial problem subgraph in the environment. The consequent is a set of node-state pairs which represent the predicted problem graph which have been identified as typically co-occurring with the antecedent problem subgraph.

The method may produce 304 a set of historical directional rules defining a problem graph based on the subsets of node-state pairs and their directional dependencies. Each rule of the set of historical directional rules may identify an indicative problem subgraph and a consequent problem subgraph formed of subsets of node-state pairs with direction dependencies.

Each of the association rules represents two parts of the problem graph; the antecedent (or indicative) problem subgraph and the consequent problem subgraph. These together form a complete problem graph which can be used to identify and predict problem graphs in live incidents.

The output of the association rule mining process is a set of historical directional rules. Each rule represents an edge between two nodes and together all of the connected rules form a historical problem graph.

Confidence scores produced by the association rule mining algorithm for each rule may be allocated 305 to the corresponding edges of the historical problem graph.

Figure 4A:
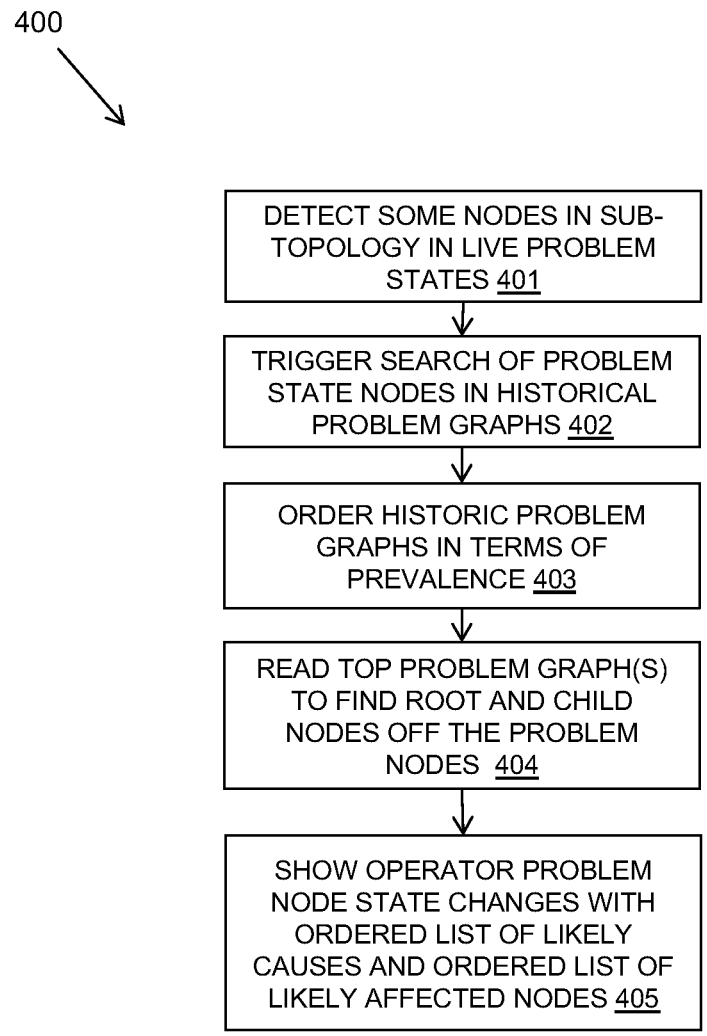
FIG. 4A is a flow diagram of an example embodiment of another aspect of a method in accordance with the present invention.
Figure 4B:
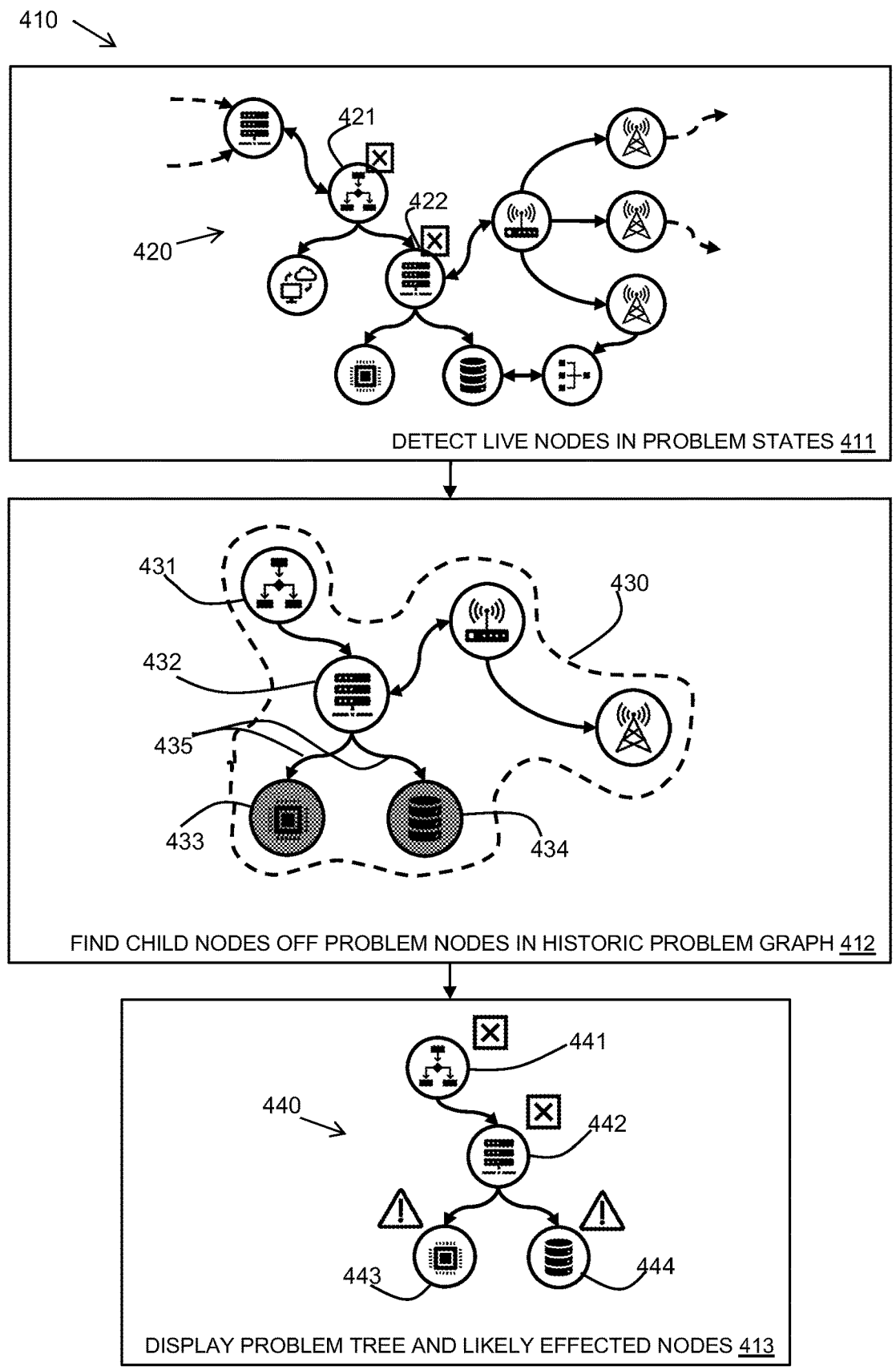
FIG. 4B is a schematic flow diagram showing an illustration of the method of FIG. 4A.

A method that is described further in the flow diagrams 400 and 410 of FIG. 4A and FIG. 4B, respectively, may predict and identify 306 problem trees in live incidents using the identified historic problem graph. A problem tree of a network topology may be obtained from a problem graph with only edges which indicate the flow of the problem state, and as such do not have cycles (loops) making them trees rather than graphs.

The described application of association rule mining produces transactions from the historic sub-topology graphs based on the problem periods encountered by neighboring resources. Each transaction consists of items which represent node-state pairs in the graph.

Example Pseudocode

The pseudocode provided below outlines an example method of forming association rule mining transactions of node-state pairs based on the problem periods in the historic sub-topology data.

Two additional hyperparameters are introduced at this stage.

QUIET_PERIOD_THRESHOLD—the quiet period threshold is a configurable time period which acts as the upper limit between resource state changes to be considered as candidates representing the same problem.

MAX_DIST_THRESHOLD—the maximum distance threshold represents the maximum distance between resources to be considered as candidates representing the same problem. This distance is calculated by a given distance function denoted "dist" which can either be a standard distance metric based on the number of hops between resources in the graph, the number of hops between problem resources, or a more complex metric encoding domain knowledge.

Pseudocode:

INPUT: res_pairs # Sub-topology (resource, state) pairs at each time interval.

intervals # list of interval times sampled.

```
# Create empty list of problem periods and active problem periods.
problems = [ ]
active_problems = [ ]
# Iterate over each time interval t.
for t in intervals:
   # Get the (resource, state) pairs at time t for the sub-topology.
   sub_topo_t = res_pairs[t]
   # Iterate over each (resource, state) pair at the time interval.
   for (res, state) in sub_topo_t:
    # Create an empty array of problems this resource is associated with.
    merge_problems = [ ]
    # Iterate over the active problems
    for curr_problem_period in active_problems:
     # If the problem is no longer active (outside quiet period threshold)
     # as determined by the active_t of the current problem,
     # then remove it from the active list and skip to the next problem.
     if t - curr_problem_period.active_t >
       QUIET_PERIOD_THRES HOLD:
       problems.add(curr_problem_period)
       active_problems.remove(curr_problem_period)
       continue
     # Iterate over the nodes in the problem.
     for p_node in curr_problem_period.nodes:
      # Check if the problem already contains this resource.
      if res == p_node.res:
       # If the node is no longer in a problem state mark it as resolved
       # and skip to the next node.
       if not isProblemState(state):
        p_node.resolved = True
        continue
      # Otherwise, update the node with the new state and time then
      # add it to the array of seen problems.
       p_node.state = state
       p_node.t = t
       merge_problems.add(curr_problem_period)
       continue
      # If the nodes are different, check if the current node is in a
      # problem state, that the two nodes are within the distance
      # threshold and are in a problem state within the quiet period.
      if isProblemState(state) and t - p_node.t <=
        QUIET_PERIOD_THRESHOLD
        and dist(res, p_node.res) <= MAX_DIST_THRESHOLD:
       # If so, add the current node to the problem and update the seen
       # problems list.
       curr_problem_period.nodes( ).put({res, state, t, resolved: False})
       curr_problem_period.active_t = t
       merge_problems.add(curr_problem_period)
    # Once we have iterated over the active problems, check if this
    resource
    # has been associated with more than one problem.
    if len(merge_problems) > 1:
     # If so, we need to merge them into a single connected problem.
     new_problem = {active_t: t, nodes: [ ]}
     active_problems.add(new_problem)
```

Figure 3B:
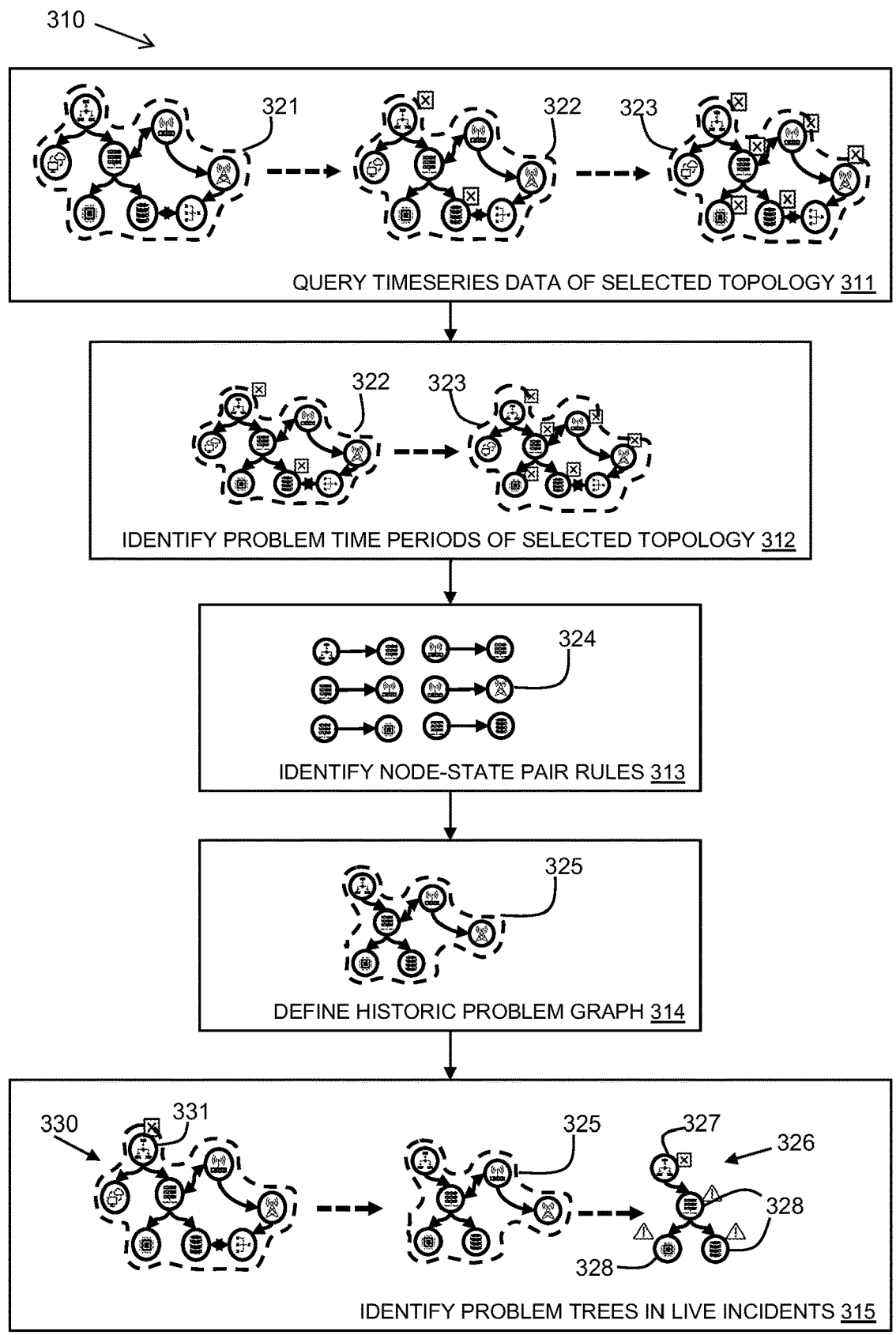
FIG. 3B is a schematic flow diagram showing an illustration of the method of FIG. 3A.

Referring to FIG. 3B, a schematic flow diagram 310 illustrates the method of FIG. 3A further.

Timeseries data of a selected sub-topology 321-323 of a selected set of nodes is queried 311. At each time interval in the timeseries, some nodes in the sub-topology 321-323 may be in problem states (indicted with the X adjacent the node).

Problem time periods are identified 312 as durations of time within the timeseries data during which one or more nodes is in a problem state. In this illustration, the time period from the sub-topology state shown in 322 to the sub-topology state shown in 323 is considered a problem time period. The assumption is made that these problem states are likely to be related.

An association rule mining algorithm is run on the nodes represented as node-state pairs 324 that are in problem states, to identify 313 relationships defined as rules between node-state pairs on different nodes. For example, a rule may be identified of the form "when node A is in error state 1, node B tends to be in error state 2".

In illustration FIG. 3B, the identified node-state rules 313 indicate that:

an error state on the virtual network indicates an error state on the virtual machine(s);

an error state on the virtual machines indicates an error state on the baseband unit;

an error state on the virtual machines indicates an error state on the virtual CPU;

an error state on the baseband unit indicates an error state on the virtual network;

an error state on the baseband unit indicates an error state on the remote radio head; and an error state on the virtual machines indicates an error state on the virtual storage.

The rules are used as edges of a new graph that is defined 314 called the historic problem graph 325, which represents the possible flows of problems through the selected sub-topology based on the node-state pair rules that have been identified 313. The problem graph 325 may be considered as representing all possible routes through which a problem could cascade through the network.

Once an historic problem graph 325 is defined 314, this may be used in future when a new, live, problem 331 occurs on the selected sub-topology 330. The historic problem graph 325 is used to identify and predict the error states as they unfold in real time, which are identified 315 by a problem tree 326. In the problem tree 326, the symbol (X) is used to indicate a node 327 in a problem state and the symbol (!) is used to indicate nodes 328 which are predicted to enter a problem state.

In the example in the diagram, a node 327 of the virtual network is shown in an error state. By consulting the historic problem graph 325, it is known that this typically indicates a problem with the virtual machines which in turn indicates a problem with the virtual CPU and virtual storage. It can therefore be predicted for the user that nodes 328 representing the virtual machine, virtual CPU, and virtual storage, will likely enter into an error/problem state soon.

Referring to FIG. 4A, a flow diagram 400 shows an example embodiment of a method of identifying problem trees for live node state changes.

Given historic problem graphs of an IT infrastructure network constructed using the method described in relation to FIG. 3A and FIG. 3B and given some state changes of some nodes to problem states, the method may automatically identify the associated problem graphs and thereby identify problem trees, allowing the operator to better find the cause of this problem state and also predict the resources that are likely to be affected by this problem.

It is assumed that considerable historical data is provided for the IT infrastructure network of the topology, from which historic problem graphs have been constructed from the generated association rules.

The method may detect 401 that some nodes in the network have gone into problem states. This may trigger a search 402 of the given problem state nodes in the historic problem graphs. One or more historic problem graph is found and, if multiple graphs are found, these are ordered 403 in terms of prevalence. The graphs may be ordered by obtaining a graph score for each of the graphs by combining the confidence scores assigned to the edges of a graph, where the confidence scores are produced by the association rule mining algorithm for each rule which corresponds to an edge of the graph.

The method may read 404 a highest ordered problem graph that may have a root and possibly child nodes off of the problem nodes. The given problem state nodes may be the antecedents of multiple association rules to predict likely affected child nodes. The given problem state nodes may also or alternatively be the consequents of the association rules to predict a likely problem root node. The edge confidence scores may be used to determine weightings of predicted affected child nodes and/or predicted likely problem root nodes.

In some embodiments, a number of the highest ordered problem graphs may be read to obtain multiple possible predictions.

The method may show 405 an operator a problem tree having the problem node state changes along with an ordered list of likely causes (roots of the problem graphs) along with an ordered list of nodes likely to be affected by this problem (child nodes of the problem node in the problem graphs). In some embodiments, the problem tree itself may not be presented to an operator and a simple list of likely root nodes and affected nodes may be provided.

The proposed method may be used to help operators in both Root Cause Analysis (RCA) as well as for predictive analysis from the same computed problem graphs.

Referring to FIG. 4B, a schematic flow diagram 410 illustrates the method of FIG. 4A further.

The method detects 411 live nodes in problem states as illustrated in the sub-topology 420 with the problem nodes shown with the symbol (X). In this example, a virtual network 421 and a virtual machine 422 are in error states in the live sub-topology 420.

A matching historic problem graph 430 is used to find 412 child nodes 433, 434 off the problem nodes 431, 432. This predicts that it is likely to see the virtual CPU 433 and virtual storage 434 enter into error states (highlighted in grey) as they are child nodes off the virtual machine 432. This prediction is made because there is a causal edge 435 in the problem graph 430 between the virtual machine 432 and both the virtual CPU 433 and virtual storage 434.

A problem tree 440 showing the problem nodes 441, 442 and the predicted affected nodes 443, 444 may be displayed 413 to an operator.

In another scenario in which the virtual machine network 421 is not in a live problem state but the virtual machine 422 is in a problem state, it may be predicted that the machine network 421 is a root cause node in a displayed problem tree.

Figure 5:
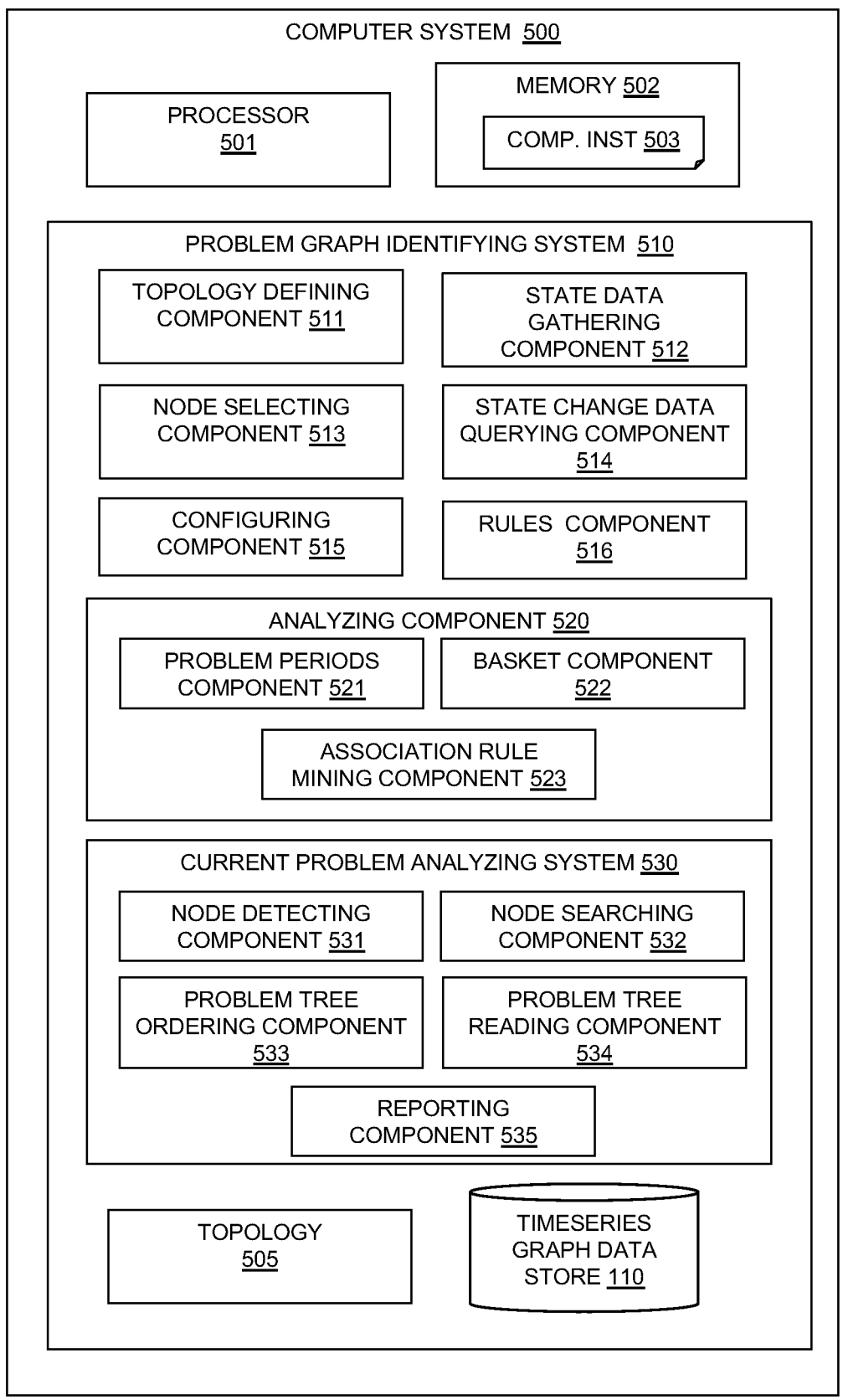
FIG. 5 is block diagram of an example embodiment of a system in accordance with the present invention.

Referring to FIG. 5, a block diagram shows an example embodiment of a computer system 500 including a problem graph identifying system 510.

The computer system 500 includes at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The problem graph identifying system 510 includes a topology defining component 511 for defining a topology 505 of a static information technology infrastructure network, with nodes representing virtual or physical resources with connectivity defined by edges in the topology, including labelling nodes to delineate domains and define sub-topologies and a state data gathering component 512 for periodically collecting state data from resources represented by the nodes and storing in a timeseries graph data store suitable for querying.

The problem graph identifying system 510 includes a node selecting component 513 for selecting a set of nodes in a topology, where the nodes of the topology represent resources in an information technology infrastructure network; the node selecting component 513 may select the set of nodes in the topology by a labelled domain.

The problem graph identifying system 510 includes a state change data querying component 514 for querying historical timeseries data for the selected nodes, where the timeseries data records changes in state of the resources represented by the nodes. A configuring component 515 may configure time intervals of the timeseries data and the problem time periods.

The problem graph identifying system 510 includes an analyzing component 520 for analyzing the timeseries data for the selected nodes across problem time periods to produce a set of historical directional rules defining an historic problem graph and a rules component 516 for producing a set of historical directional rules defining an historic problem graph, where each rule of the set of historical directional rules identifies an indicative problem subgraph and a consequent problem subgraph formed of subsets of resource-state pairs with direction dependencies. The rules component 516 may allocate a confidence score to each edge of an historic problem graph based on a score produced for a historical directional rule.

The analyzing component 520 may include a problem periods component 521 for identifying problem time periods in which neighboring nodes change problem state indicative of causality relationships; and an association rule mining component 523 for determining if causality relationships consistently occur by applying an association rule mining algorithm.

The problem periods component 521 may include a transaction component 522 for producing transactions based on the problem time periods; and wherein the association rule mining component performs association rule mining on the transactions to identify subsets of items in the form of resource-state pairs which typically co-occur across multiple transactions and a directional dependency between them, and produces the set of historical directional rules defining a problem graph based on the subsets of resource-state pairs and their directional dependencies. The transaction component 522 may produce transactions based on the problem time periods includes defining a quiet period threshold to define a single problem time period and defining a distance threshold for nodes relating to the same problem.

A current problem analyzing system 530 may be provided for analyzing resources of the network with current problem states by searching the historic problem graphs for current problem state nodes to determine likely causing nodes and affected nodes of a current problem.

The current problem analyzing system 530 includes a node detecting component 531 for detecting a set of nodes in a topology with a current problem state, wherein the nodes of the topology represent resources in an information technology infrastructure network; a node searching component 532 for searching for the problem state nodes in historic problem graphs; a problem graph ordering component 533 for ordering the historic problem graphs by prevalence; a problem graph reading component 534 for reading the historic problem graphs to find root and child nodes off the problem nodes; and a reporting component 535 for showing problem node state changes with an ordered list of likely causes and an ordered list of likely affected nodes.

Figure 6:
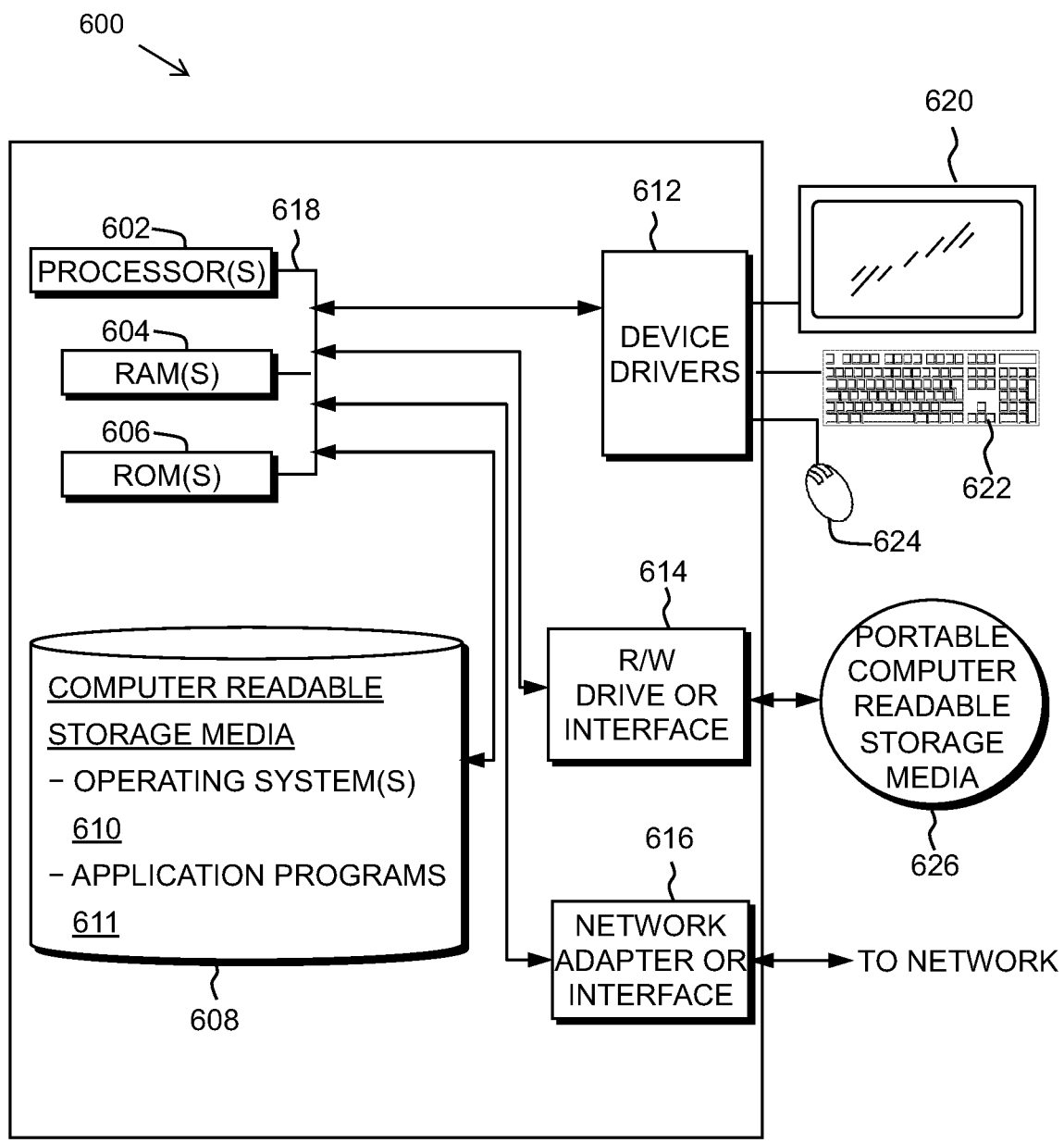
FIG. 6 is a block diagram of an embodiment of a computer system or cloud server in which the present invention may be implemented.

FIG. 6 depicts a block diagram 600 of components of a computing system as used for the computing system 500, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Some embodiments of the present invention provide a computer-implemented method for identifying problem graphs in an information technology infrastructure network. The operations of this method are as follows (and not necessarily in the following order): (i) detecting a set of nodes in a topology with a current problem state, wherein the nodes of the topology represent resources in an information technology infrastructure network; (ii) searching for the problem state nodes in one or more historic problem graphs; (iii) ordering the historic problem graphs by prevalence; (iv) reading one or more of the ordered historic problem graphs to find root and/or child nodes off the problem nodes; and (v) obtaining a problem tree with problem node state changes to produce an ordered list of likely causes and/or an ordered list of likely affected nodes.

Some embodiments of the present invention include the following features, characteristics, and/or advantages: (i) allocating a confidence score to each edge of the historic problem graph based on a score produced for a historical directional rule; (ii) defining a topology of an information technology infrastructure network, with nodes representing virtual or physical resources with connectivity defined by edges in the topology, including labelling nodes to delineate domains and define sub-topologies; and (iii) selecting the set of nodes in the topology by a labelled domain.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, such as the problem graph identifying system 510 and the current problem analyzing system 530 are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 614 to read from and write to one or more portable computer readable storage media 626. Application programs 611 on the computing system can be stored on one or more of the portable computer readable storage media 626, read via the respective RAY drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
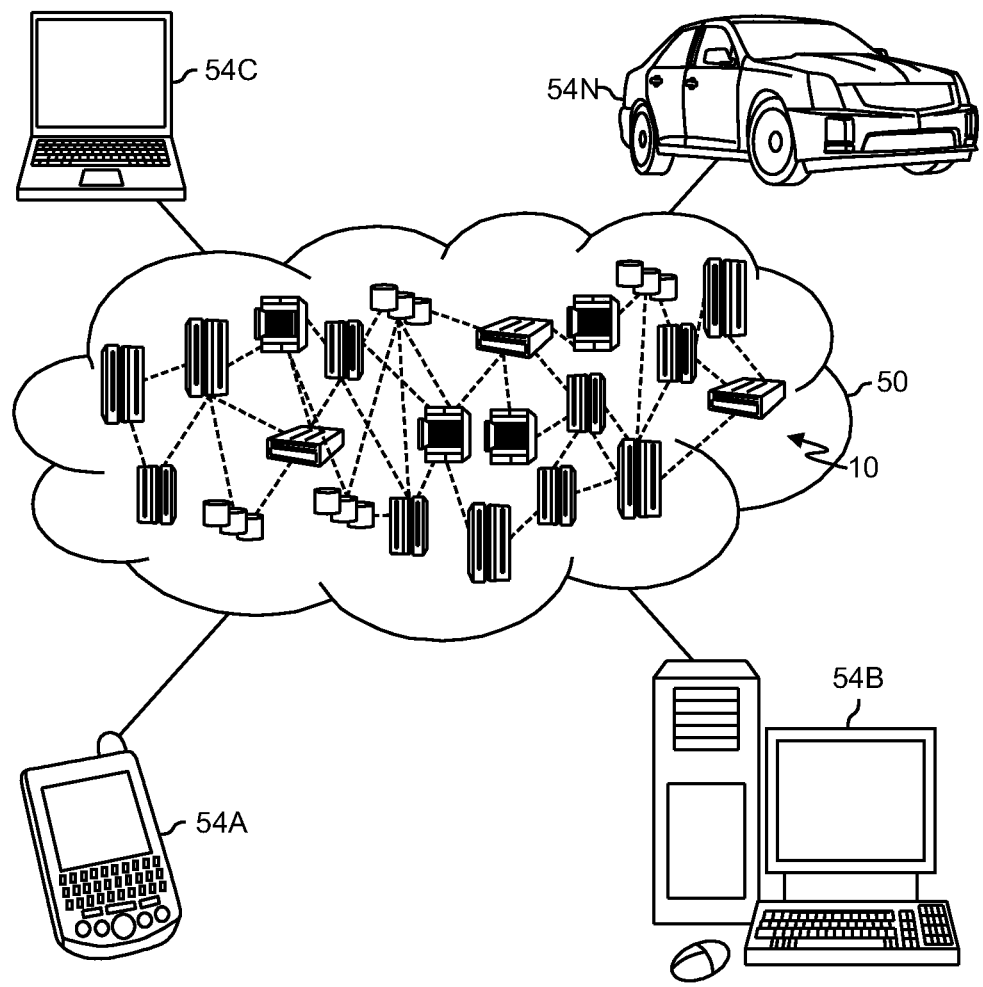
FIG. 7 is a schematic diagram of a cloud computing environment in which the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
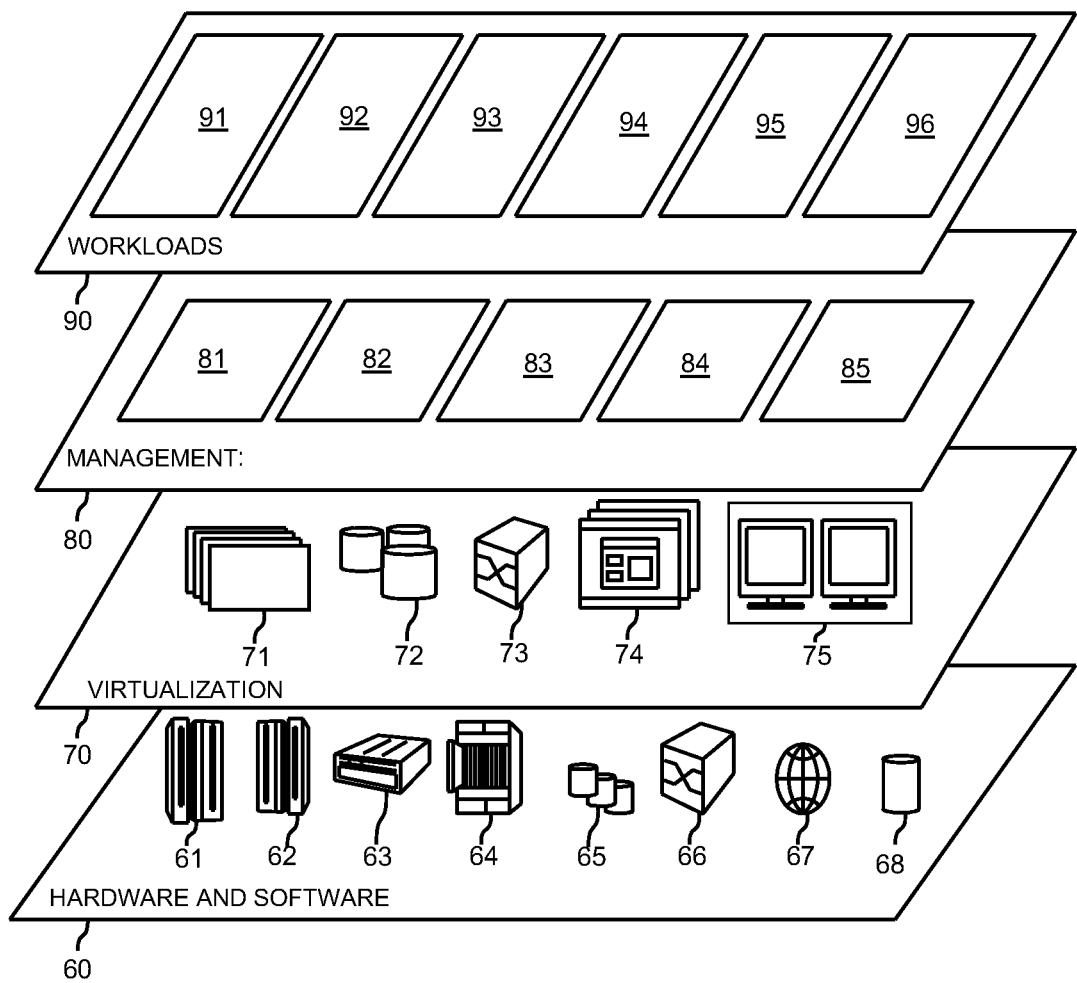
FIG. 8 is a diagram of abstraction model layers of a cloud computing environment in which the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and root cause analysis and problem graph identifying processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method comprising:
selecting a set of nodes in a topology, wherein the nodes of the topology represent resources in an information technology infrastructure network;
querying historical timeseries data for the selected nodes, wherein the timeseries data records changes in state of the resources represented by the nodes; and
analyzing the timeseries data for the selected nodes across problem time periods to produce a set of historical directional rules defining one or more historic problem graph, with the analysis including:
producing transactions based on the problem time periods by:
defining a quiet period threshold to define a single-problem time period where one problem is present, and
defining a distance threshold for nodes relating to the one problem, with the distance threshold defining a maximum distance between nodes to be considered as candidates that are relating to the one problem, and with the distance threshold being calculated by a first distance function;
identifying problem time periods in which neighboring or close nodes change problem state indicative of causality relationships, and
determining if causality relationships consistently occur by applying an association rule mining algorithm to the transactions.

2. The method of claim 1, wherein each rule of the set of historical directional rules identifies an indicative problem subgraph and a consequent problem subgraph formed of subsets of node-state pairs with direction dependencies.

3. The method of claim 1, wherein analyzing the timeseries data for the selected nodes includes:
identifying, within the transactions during the single-problem time period, subsets of items in the form of node-state pairs which co-occur across multiple transactions and a directional dependency between them, with the directional dependency including an antecedent node-state pair and a consequent node-state pair; and
producing the set of historical directional rules defining an historical problem graph based on the subsets of node-state pairs and their directional dependencies.

4. The method of claim 1 further including:
searching the historic problem graphs for current problem state nodes to determine likely causing nodes and/or affected nodes of a current problem.

5. The method of claim 4, further including:
ordering the historic problem graphs and reading the historic problem graphs to find root and/or child nodes off the problem nodes to determine a root cause of a problem and/or to predict affected resources, wherein the ordering is based on combined allocated confidence scores of each edge of a historic problem graph based on scores produced for each historical directional rule.

6. The method of claim 1, including:
periodically collecting state data from resources represented by the nodes and storing in a timeseries graph data store suitable for querying, including configuring time intervals of the timeseries data.

7. The method of claim 1, further comprising:
defining a topology of an information technology infrastructure network, with nodes representing virtual or physical resources with connectivity defined by edges in the topology, including labelling nodes to delineate domains and define sub-topologies.

8. A system for identifying problem graphs in an information technology infrastructure network, the system comprising:
- a processor and a memory configured to provide computer program instructions to the processor to execute functions of a set of components:
- a node selecting component for selecting a set of nodes in a topology, wherein the nodes of the topology represent resources in an information technology infrastructure network;
- a state change data querying component for querying historical timeseries data for the selected nodes, wherein the timeseries data records changes in state of the resources represented by the nodes; and
- an analyzing component for analyzing the timeseries data for the selected nodes across problem time periods to produce a set of historical directional rules defining one or more historic problem graph, and with the analyzing component including:
  - a transaction component for producing transactions based on the problem time periods by:
    - defining a quiet period threshold to define a single-problem time period where one problem is present, and
    - defining a distance threshold for nodes relating to the one problem, with the distance threshold defining a maximum distance between nodes to be considered as candidates that are relating to the one problem, and with the distance threshold being calculated by a first distance function;
  - a problem periods component for identifying problem time periods in which neighboring or close nodes change problem state indicative of causality relationships, and
  - an association rule mining component for determining if causality relationships consistently occur by applying an association rule mining algorithm to the transactions.

9. The system of claim 8, wherein the analyzing component includes a rules component for producing a set of historical directional rules defining an historic problem graph, wherein each rule of the set of historical directional rules identifies an indicative problem subgraph and a consequent problem subgraph formed of subsets of node-state pairs with direction dependencies.

10. The system of claim 8, wherein the association rule mining component
- identifies, within the transactions during the single-problem time period, subsets of items in the form of node-state pairs which co-occur across multiple transactions and a directional dependency between them, with the directional dependency including an antecedent node-state pair and a consequent node-state pair, and produces the set of historical directional rules defining an historical problem graph based on the subsets of node-state pairs and their directional dependencies.

11. The system of claim 8 further including:
- a current problem analyzing component for searching the historic problem graphs for current problem state nodes to determine likely causing nodes and affected nodes of a current problem.

12. The system of claim 8 further including:
- a topology defining component for defining a topology of an information technology infrastructure network, with nodes representing virtual or physical resources with connectivity defined by edges in the topology, including labelling nodes to delineate domains and define sub-topologies.

13. The system of claim 8 further including:
- a state data gathering component for periodically collecting state data from resources represented by the nodes and storing in a timeseries graph data store suitable for querying.

14. The system of claim 8 further including a configuring component for configuring time intervals of the timeseries data and the problem time periods.

15. A computer program product for identifying problem graphs in an information technology infrastructure network, the computer program product comprising a non-transitory computer readable storage medium having program instructions embodied therewith, the program instructions executable by a processor to cause the processor to:
- select a set of nodes in a topology, wherein the nodes of the topology represent resources in an information technology infrastructure network;
- query historical timeseries data for the selected nodes, wherein the timeseries data records changes in state of the resources represented by the nodes; and
- analyze the timeseries data for the selected nodes across problem time periods to produce a set of historical directional rules defining one or more historic problem graph, with the analysis including:
  - producing transactions based on the problem time periods by:
    - defining a quiet period threshold to define a single-problem time period where only one problem is present, and
    - defining a distance threshold for nodes relating to the one problem, with the distance threshold defining a maximum distance between nodes to be considered as candidates that are relating to the one problem, and with the distance threshold being calculated by a first distance function;
  - identifying problem time periods in which neighboring or close nodes change problem state indicative of causality relationships, and
  - determining if causality relationships consistently occur by applying an association rule mining algorithm to the transactions.

16. The computer program product of claim 15, including program instructions executable by a processor to cause the processor to:
- detect a set of nodes in a topology with a current problem state, wherein the nodes of the topology represent resources in an information technology infrastructure network;
- search for the problem state nodes in one or more historic problem graphs;
- order the historic problem graphs by prevalence;
- read one or more of the ordered historic problem graphs to find root and/or child nodes off the problem nodes; and
- obtain a problem tree with problem node state changes to produce an ordered list of likely causes and/or an ordered list of likely affected nodes.

17. The computer program product of claim 15, wherein causing the processor to analyze the timeseries data for the selected nodes includes:
- identifying, within the transactions during the single-problem time period, subsets of items in the form of node-state pairs which co-occur across multiple transactions and a directional dependency between them, with the directional dependency including an antecedent node-state pair and a consequent node-state pair; and producing the set of historical directional rules defining an historical problem graph based on the subsets of node-state pairs and their directional dependencies.

18. The computer program product of claim 15, further causing the processor to:

search the historic problem graphs for current problem state nodes to determine likely causing nodes and/or affected nodes of a current problem.

19. The computer program product of claim 15, further causing the processor to:

define a topology of an information technology infrastructure network, with nodes representing virtual or physical resources with connectivity defined by edges in the topology, including labelling nodes to delineate domains and define sub-topologies.

20. The computer program product of claim 15, further causing the processor to:

periodically collect state data from resources represented by the nodes and storing in a timeseries graph data store suitable for querying.

* * * * *